United States Patent Office 3,654,320
Patented Apr. 4, 1972

1

3,654,320
ORGANIC PROCESSES
Donald Emory Ayer, John C. Babcock, and J. Allan Campbell, Kalamazoo, Mich., assignors to The Upjohn Company, Kalamazoo, Mich.
No Drawing. Filed Mar. 24, 1970, Ser. No. 22,382
Int. Cl. C07c 169/20
U.S. Cl. 260—397.4
36 Claims

ABSTRACT OF THE DISCLOSURE

This invention relates to novel processes for preparing the known useful compounds of the formula

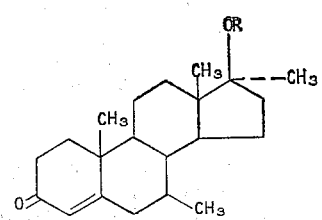

wherein R is selected from the group consisting of hydrogen and the acyl radical of a hydrocarbon carboxylic acid containing from one through twelve carbon atoms. It also relates to novel intermediates obtained in the course of carrying out the aforesaid novel processes. Two alternative methods for producing the compounds embraced by the above formula (designated Process A and Process B) can be employed and are described below. The systemic administration of the compounds of the above formula produces a favorable anabolic effect in humans and animals due to their favorable anabolic:androgenic ratio. These compounds are also useful as gonadatropin inhibitors.

BRIEF SUMMARY OF THE INVENTION

The present invention provides novel processes for the preparation of 7β,17α - dimethyl - 17 - hydroxyandrost-4-en-3-one and its 17-acylates of the formula

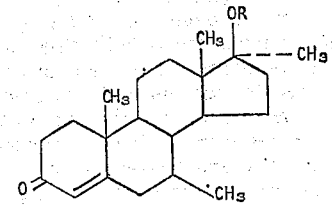

wherein R has the same meaning as above. Either of Processes A or B, described below, can be utilized.

2

PROCESS A

This process is illustratively represented by the following sequence of formulae:

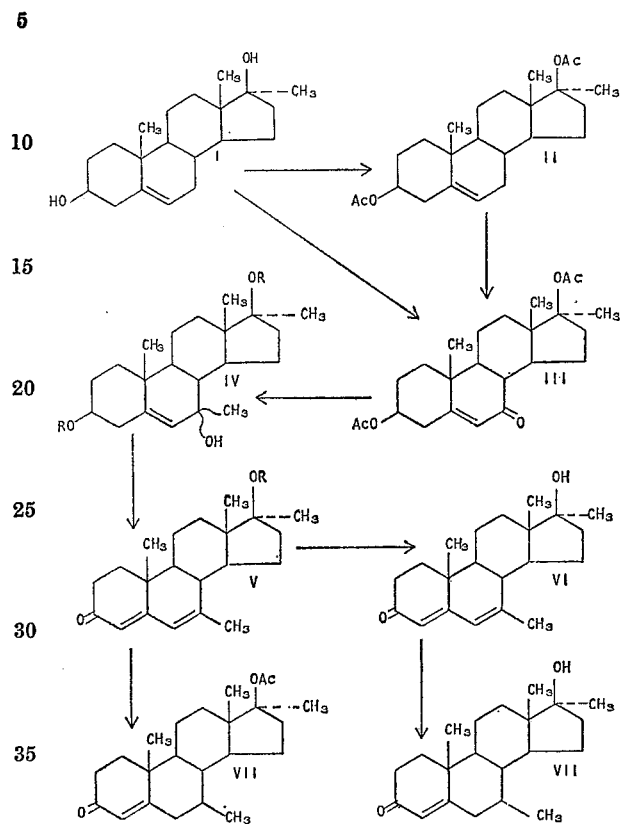

wherein Ac is the acyl radical of an organic carboxylic acid, preferably a hydrocarbon carboxylic acid, containing from one through twelve carbon atoms, R is selected from the group consisting of hydrogen and Ac, and ∼ is a generic expression denoting α-bonds and β-bonds and mixtures thereof.

Examples of organic carboxylic acids of one through twelve carbon atoms include, for example, saturated and unsaturated aliphatic acids and aromatic acids such as formic, acetic, propionic, butyric, isobutyric, tert.-butylacetic, valeric, isovaleric, caproic, caprylic, decanoic, dodecanoic, acrylic, crotonic, cyclobutanecarboxylic, cyclopentanecarboxylic, cyclopentenecarboxylic, cyclohexanecarboxylic, dimethylcyclohexanecarboxylic, adamantane carboxylic, benzoic, toluic, naphthoic, ethylbenzoic, phenylacetic, naphthaleneacetic, phenylvaleric, cinnamic, phenylpropiolic, phenylpropionic, succinic, glutaric, dimethylglutaric, maleic, cyclopentylpropionic acids, and the like.

The compounds embraced by Formulae VII and VII′ of the flow-sheet, above, are prepared by the novel process shown therein, employing the methods and reactions described below.

(1) The first step of the novel process involves the 3,17-diacylation of the known compound 17α-methyl-5-androstene-3β,17β-diol (I) employing known procedures, e.g., heating said compound with an acid anhydride of an organic carboxylic acid (as in Helv. 22, 962) to yield a corresponding 17α-methyl-5-androstene-3β,17β-diol 3,17-diacylate (II). The 3,17-diformate (II) is obtained by heating the compound of Formula I with concentrated formic acid.

(2) The next step of the process comprises oxidizing at the 7-position a 17α-methyl-5-androstene-3β,17β-diol 3,17-diacylate (II) produced in step (1) to yield a corresponding 17α-methyl-7-oxoandrost-5-ene-3β,17β-diol 3,17-diacylate (III). This oxidation is effected with an oxygenated chromium compound (wherein the chromium is hexavalent), e.g., sodium chromate, potassium chromate or chromium trioxide-pyridine complexes; t-butyl chromate can also be utilized (see: Coll. Czech. Comm. 26, 1958).

The starting compound (I) can be converted directly to a 17α-methyl-7-oxoandrost-5-ene-3β,17β-diol 3,17-diacylate (III) without isolation of a 17α-methyl-5-androstene-3β,17β-diol 3,17-diacylate (II).

(3) A 7-keto compound (III) produced in step (2) is methylated at the 7-position by mixing it with a methylmagnesium halide (e.g., methylmagnesium bromide or methylmagnesium chloride) at low or moderate (room) temperature, to yield a mixture of corresponding 7,17α-dimethylandrost-5-ene-3β,7,17β-triol 3,17-diacylates (IV), corresponding 7,17α-dimethylandrost-5-ene-3β,7,17β-triol 17-acylates (IV) and 7,17α-dimethylandrost-5-ene-3β,7,17β-triol (IV). The components of the mixture can be separated and purified by conventional procedures, e.g., by elution chromatography, fractional crystallization or gradient elution chromatography.

(4) In this step of the process, a 7-methyl-7-hydroxy compound (IV) is subjected to the known Oppenauer oxidation procedure, e.g., by heating it at reflux temperature in a solvent having a high boiling point (such as toluene or xylene) with an aluminum alkoxide (or phenoxide) such as aluminum isopropoxide in the presence of a ketone (such as cyclohexanone), to yield the corresponding 7,17α-dimethyl-17-hydroxyandrosta-4,6-dien-3-one (VI) or 17-acylate (V) as the main products. Compounds produced in lesser amounts, 7,17α-dimethyl-7,17-dihydroxyandrost-4-en-3-one 17-acylates and 7,17α-dimethyl-7,17-dihydroxyandrost-4-en-3-one can be separated and purified in the manner set forth at the end of step (3), above.

(5) In this step a 7,17α-dimethyl-17-hydroxyandrosta-4,6-dien-3-one 17-acylate (V) has its 17-acylate group hydrolyzed, for example, by heating it (e.g., at reflux) in a lower alkanol such as methanol with an alkali metal hydroxide (e.g., potassium hydroxide or sodium hydroxide) to yield 7,17α-dimethyl-17-hydroxyandrosta-4,6-dien-3-one (VI). This compound (VI) can be prepared from a 7-ketone (III) without purification of the compounds of Formulae IV and V produced in steps (3) and (4), above.

(6) Reducing the double bond at the 6-position of 7,17α-dimethyl-17-hydroxyandrosta-4,6-dien-3-one (VI) with a hydrogenation catalyst and a hydrogen donor yields 7β,17α-dimethyl-17-hydroxyandrost-4-en-3-one (VII). This procedure does not employ hydrogen gas but instead uses a hydrogen donor, e.g., cyclohexene, to supply hydrogen for the saturation of the Δ⁶-bond; it gives yields much higher than prior art processes utilizing a catalyst with hydrogen gas (see: J. Amer. Chem. Soc. 81, 408, 432, 4071 and 82, 170; J. Org. Chem. 24, 121); an additional advantage is that there is very little over-reduction and only 1 to 3% of the unwanted 7α-methyl isomer is produced. The preferred hydrogenation catalyst for this procedure is palladium on calcium carbonate, which is superior to palladium on carbon catalysts. This reaction (VI→VII) is carried out, preferably, at about room temperature (25° C.) in an alcoholic solvent (e.g., methanol and water). The catalyst is pre-reduced at higher temperatures.

The reduction procedure of step (6), above, can also be applied directly to the 7,17α-dimethyl-17-hydroxyandrosta-4,6-dien-3-one 17-acylates (V) prepared in (4), above, without hydrolysis of the 17-acyl group described in step (5), above, to give a corresponding 7,17α-dimethyl-17-hydroxyandrosta-4-en-3-one 17-acylate (VII').

PROCESS B

This process is illustratively represented by the following sequence of formulae:

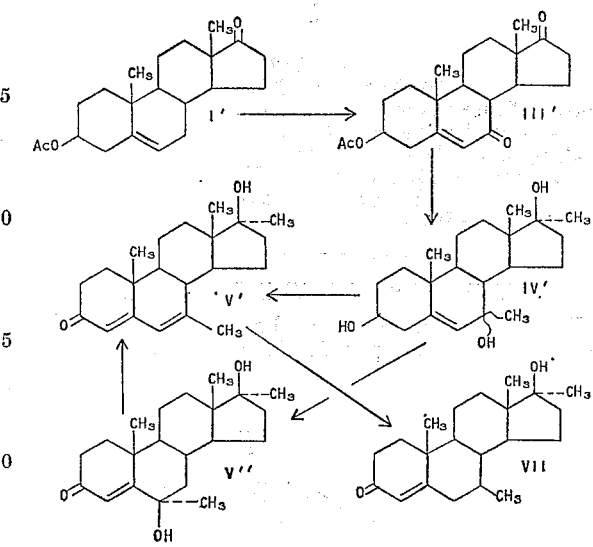

wherein Ac and ∼ have the same meaning recited following the sequence of formulae in Process A, above.

The compound of Formula VII of the flow-sheet, above, is prepared by the novel process shown therein, employing the methods and reactions described below.

(1) The first step of the novel process, namely, oxidizing at the 7-position of an androst-5-en-3β-ol-17-one 3-acylate (I') to yield a corresponding 3β-hydroxyandrost-5-ene-7,17-dione 3-acylate (III'), is essentially the same as step (2) of Process A, above.

(2) The next step of the process comprises simultaneously methylating the 7- and 17-positions of 3β-hydroxyandrost-5-ene-7,17-dione 3-acylate (III') produced in step (1) to yield 7,17α-dimethylandrost-5-ene-3β,7,17β-triol (IV'), by mixing the former (III') with a methylmagnesium halide (wherein the halogen is preferably bromine or chlorine) at low or moderate (room) temperature. The mixture of compounds comprising IV' can be separated into 7α,17α-dimethylandrost-5-ene-3β,7β,17β-triol (IV') and 7β,17β-dimethylandrost-5-ene-3β,7α,17β-triol (IV') and purified by conventional procedures, such as elution chromatography, fractional crystallization and gradient elution chromatography.

(3) In this step, the crude 7,17α-dimethylandrost-5-ene-3β,7,17β-triol (IV') obtained in step (2) is subjected to the known Oppenauer oxidation reaction, employing essentially the same procedures as in step (4) of Process A, above, to yield a mixture of mainly 7,17α-dimethyl-17-hydroxyandrosta-4,6-dien-3-one (V') plus a small amount of 7β,17β-dihydroxy-7-17-dimethylandrost-4-en-3-one (V''). The components of the mixture can be separated and purified by conventional procedures, e.g., by elution chromatography, fractional crystallization or gradient elution chromatography. The by-product 7β,17β-dihydroxy-7,17-dimethyl-androst-4-en-3-one (V'') is readily converted to the principal product (V'), e.g., by heating, preferably, at reflux, in an alkanol (such as methanol) with a dilute acid (such as hydrochloric acid) or a base (such as potassium hydroxide).

(4) This step of the process reduces the double bond at the 6-position of 7,17α-dimethyl-17-hydroxyandrosta-4,6-dien-3-one (V') to yield 7β,17β-dimethyl-17-hydroxyandrost-4-en-3-one (VII) by essentially the same procedure employed in step (6) of Process A, above.

All of the compounds included within Formulae II through VII and VII' of Process A and III', IV', V', V" and VII of Process B of the flow-sheets, above, can be isolated from their respective reaction mixtures by conventional means, for example, when a water-miscible solvent is used, by pouring the reaction mixture into water and separating the resulting precipitate by filtration or by extraction with water-immiscible solvents. Additional purification of the products can be accomplished by conventional means, for example, by elution chromatography from an adsorbent column with a suitable solvent such as acetone, ethyl acetate, ether, methylene chloride and Skellysolve B (hexanes), mixtures and combinations of these solvents; also by gradient elution chromatography from an adsorbent column with a suitable mixture of solvents, such as, methylene chloride-Skellysolve B, acetone-Skellysolve B, and the like.

The compounds of Formulae VII and VII' prepared by the novel processes of the invention can be administered to humans and animals, in a wide variety of oral or parenteral dosage forms, singly or in admixture with other coacting compounds, in doses of about 1 to 1,000 mg. one to three times a day, depending on the severity of the condition being treated and the recipient's response to the medication. They can be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups or elixirs.

DETAILED DESCRIPTION

The following examples described the manner and process of making and using the invention and set forth the best mode contemplated by the inventors of carrying out their invention, but are not to be construed as limiting the scope thereof.

EXAMPLE 1A (a) 17α-methyl-5-androstene-3β,17β-diol 3,17-diacetate (II)
(b) 17α-methyl-7-oxoandrost-5-ene-3β,17β-diol 3,17-diacetate (III)

A mixture of 40 g. of 17α-methyl-5-androstene-3β,17β-diol (I) and 200 ml. of acetic anhydride is heated under reflux for about 2 hours, then allowed to cool, to give (a) 17α-methyl-5-androstene-3β,17β-diol 3,17-diacetate (II). To this material (II) 320 ml. of acetic acid is added and the temperature maintained at about 30° C. while 40 g. of powdered anhydrous sodium chromate is added. The reaction mixture is stirred at about 29° C. for 48 hours. About 1400 ml. of water is slowly added, the reaction mixture cooled to about 5° C. and allowed to stand at that temperature for about 16 hours. The product is collected, washed with water, then the filter cake is dissolved in methylene chloride, the solution washed with water, aqueous potassium carbonate, dried and evaporated. Crystallization from 150 ml. of methanol gives 28 g. (53% yield) of (b) 17α-methyl-7-oxoandrost-5-ene-3β,17β-diol 3,17-diacetate (III), melting at 176 to 179° C. (softening at 169° C.). Two recrystallizations from methanol give an analytical sample melting at 172 to 177° C.

*Analysis.*—Calcd. for $C_{24}H_{34}O_5$ (percent): C, 71.61; H, 8.51. Found (percent): C, 71.65; H, 8.33.

Following the procedure of Example 1A but substituting another anhydride for acetic anhydride, such as propionic, valeric, isobutyric, phenylacetic, acrylic, cyclohexanecarboxylic, naphthaleneacetic, cinnamic, glutaric anhydride, etc., yields the corresponding 17α-methyl-5-androstene-3β,17β-diol 3,17-diacylate (II) and 17α-methyl-7-oxoandrost-5-ene-3β,17β-diol 3,17-diacylate (III). Temperature and time of reaction can be adjusted to assure completion of the reaction. Heating the compound of Formula I with concentrated formic acid yields the corresponding 3,17-diformate (II), which on treatment with anhydrous sodium chromate yields 17α-methyl-7-oxoandrost-5-ene-3β,17β-diol 3,17-diformate (III).

EXAMPLE 2A (a) 7,17α-dimethylandrost-5-ene-3β,7,17β-triol 3,17-diacetate (IV)
(b) 7,17α-dimethylandrost-5-ene-3β,7,17β-triol 17-acetate (IV)
(c) 7,17α-dimethylandrost-5-ene-3β,7,17β-triol (IV)

A solution of 16.25 g. of 17α-methyl-7-oxoandrost-5-ene-3β,17β-diol 3,17-diacetate (III) obtained as in Example 1A in 160 ml. of xylene is cooled to about 2° C. under an atmosphere of nitrogen and a Grignard reagent comprising a solution of 3 M methylmagnesium bromide in 100 ml. of ether, added rapidly with vigorous stirring. The mixture thickens after about 25 ml. of the reagent is added and becomes a thin slurry after the addition of 75 ml. The temperature of the reaction mixture rises to about 25° C. during the addition of Grignard reagent in about 3 minutes. The reaction mixture is cooled to about 5° C. over a period of about 7 minutes and stirred for about 15 minutes at the same temperature. Thin layer chromatography (TLC) at this time shows mainly (a), above, plus a significant amount of (b), above, and a trace of (c), above. The reaction mixture is warmed to about 20° C. over a period of about 10 minutes, stirred about 30 minutes at about 20° C. and then cooled in an ice bath while a mixture of 100 ml. of saturated ammonium chloride solution, 100 ml. of water and 100 ml. of ice is added. The temperature of the reaction mixture rises to about 50° C. and some ether boils off. The reaction mixture is cooled to about 25° C., 100 ml. of saturated ammonium chloride solution is added, the mixture is stirred for about 30 minutes, then transferred to a separatory funnel and the reaction flask rinsed with 40 ml. of xylene. The aqueous layer in the funnel is discarded after being washed with 60 ml. of xylene. The xylene extracts are washed with 100 ml. of saturated sodium chloride solution, then the extracts filtered through sodium sulfate. The clear pale yellow solution shows (by TLC) mainly (b) 7,17α-dimethylandrost-5-ene-3β,7,17β-triol 17-acetate (IV) with a small amount of (a) 7,17α-dimethylandrost-5-ene-3β,7,17β-triol 3,17-diacetate (IV) and (c) 7,17α-dimethylandrost-5-ene-3β,7,17β-triol (IV).

Following the procedure of Example 2A but substituting another starting 17α-methyl-7-oxoandrost-5-ene-3β,17β-diol 3,17-diacylate (III), such as the 3,17-dibutyrate, 3,17-ditoluate, 3,17-disuccinate, 3,17-dicyclopentylpropionate, etc., yields the corresponding 7,17α-dimethylandrost-5-ene-3β,7,17β-triol-17-acylate (IV), 7,17α-dimethylandrost-5-ene-3β,7,17β-triol 3,17-diacylate (IV) and 7,17α-dimethylandrost-5-ene-3β,7,17β-triol (IV).

EXAMPLE 3A (a) 7,17-α-dimethyl-17-hydroxyandrosta-4,6-dien-3-one 17-acetate (V)
(b) 7,17α-dimethyl-17-hydroxyandrosta-4,6-dien-3-one (VI)
(c) 7,17α-dimethyl-7,17-dihydroxyandrost-4-en-3-one 17-acetate
(d) 7,17α-dimethyl-7,17-dihydroxyandrost-4-en-3one The xylene solution from Example 2A is distilled until its internal temperature is 138° C., then 50 ml. of cyclohexanone is added and the solution refluxed through a water separator for about 10 minutes, then cooled to about 110° C. Aluminum isopropoxide (2.6 g.) is added and the reaction mixture is stirred under reflux for 50 min. A second addition of 2.6 g. of aluminum isopropoxide is made to the hot solution and refluxing continued for about 40 minutes. The reaction mixture is then cooled to 90° C., then 17 ml. of acetic acid and then 8 ml. of water added. Stirring and cooling is continued until the internal temperature is 15° C. The white precipitate of aluminum acetate is collected and washed with 50 ml. of toluene. The filtrate is steam distilled for about 2 hours and then allowed to cool to about 25° C. to a solidified oily material. The aqueous layer is decanted and the residue dissolved in 200 ml. of methylene chloride, the solution washed twice with 1 N aqueous potassium bicarbonate, dried with magnesium sulfate and evaporated to 14.88 g. of thick, pale orange oil. TLC showed the presence of mainly (a) 7,17α-dimethyl-17-hydroxyandrosta-4,6-dien-3-one 17-acetate (V) along with smaller amounts of (b) 7,17-dimethyl - 17 - hydroxyandrosta-4,6-dien-3-one (VI), (c) 7,17α-dimethyl-7,17-dihydroxyandrost-4-en-3-one 17-acetate and (d) 7,17α-dimethyl-7,17-dihydroxyandrost-4-en-3-one.

Following the procedure of Example 3A but substituting another starting 7,17α - dimethylandrost-5-ene-3β,7,17β-triol-17-acylate (IV) and 7,17α - dimethylandrost-5-ene-3β,7,17β - triol 3,17-diacylate (IV) with 7,17α-dimethylandrost-5-ene-3β,7,17β-triol) such as the 17-t-butylacetate, 17 - caprylate, 17-crotonate, 17-decanoate, 17-phenylacetate, 17-glutarate, etc. (and their 3,17-diacylate counterparts), yields the corresponding 7,17α - dimethyl-17-hydroxyandrosta - 4,6-dien-3-one 17-acylate (V), 7,17α-dimethyl - 17-hydroxyandrosta-4,6-dien-3-one (VI), 7, 17α-dimethyl - 7,17 - dihydroxyandrost-4-en-3-one 17-acylate and 7,17α-dimethyl-7,17-dihydroxyandrost-4-en-3-one.

EXAMPLE 4A 7,17α-dimethyl-17-hydroxyandrosta-4,6-dien-3-one (VI)

The mixture of products from Example 3A is dissolved in 150 ml. of boiling methanol and 10 ml. of 45% aqueous potassium hydroxide solution added to the reaction mixture and refluxed for about 2.5 hours. A solution of 10 ml. of acetic acid in 25 ml. of methanol is added to the hot solution, the reaction mixture cooled slightly and then evaporated in vacuo at about 50° C. to a gummy residue. This material is partitioned between 100 ml. of methylene chloride and 100 ml. of water. The aqueous layer is washed with methylene chloride, the organic extracts washed with potassium bicarbonate solution, dried and evaporated to 13 g. of a yellow foam. TLC shows 7,17α-dimethyl - 17-hydroxyandrosta-4,6-dien-3-one (VI) to be the main product. The crude product is chromatographed on 300 ml. of neutral alumina (deactivated with 3% water) and eluted with 5 l. of Skellysolve B (hexanes) and then over a gradient with 5 l. of 5% ethyl acetate-Skellysolve B and 5 l. of 40% ethyl acetate-Skellysolve B. A peak fraction homogeneous by TLC is obtained weighing 9.5 g. (75% yield). This is crystallized by trituration with moist ether. The product is collected and dried in vacuo at about 25 C. for about 4 days to give 6.7 g. (52% yield) of hydrated 7,17α - dimethyl-17-hydroxyandrosta-4,6-dien-3-one (VI), having λmax. 296 mμ (ε=27700); H₂O (Karl Fischer assay) 3.39%.

EXAMPLE 5A

7β,17α-dimethyl-17-hydroxyandrost-4-en-3-one (VII) (7β, 17α-dimethyltestoterone)

In a 5 l. round bottom, three-necked flask equipped with a stirrer, reflux condenser, thermometer and a nitrogen inlet, 40 g. of 3% palladium/calcium carbonate catalyst, 2.8 l. of methanol, 320 ml. of water and 192 ml. of cyclohexene is placed. The mixture is stirred and heated in a mantle. After about 30 minutes the temperature is 56° C. and the catalyst starts to turn from brown to black. In about 5 minutes the solution is refluxing gently at about 61° C. The heating mantle is replaced with a cold water bath and the reaction mixture cooled to about 25° C. To the catalyst mixture, 160 g. of 7,17α-dimethyl-17-hydroxyandrosta - 4,6-dien-3-one (VI) slurried with 400 ml. of methanol, is added rapidly. Another 100 ml. of methanol is used for wash. The mixture is stirred at about 25° C. and aliquots removed for analysis after 5, 34, 55, 68, 75, 92, 100 and 116 hours. After about 72 hours, TLC analysis showed substantial amounts of starting material still present so an additional 8 g. of the same lot of catalyst is slurried with 25 ml. of methanol and added to the reaction mixture. Another 50 ml. of methanol is used for wash. After about 92 hours of stirring at about 25° C., 2 to 3% of starting material (VI) is detected so another 4 g. of catalyst is added with methanol as previously. After another 12 hours (for a total reaction time of 116 hours) no starting material is detected by TLC or gas-liquid chromatography (GLC). The reaction mixture is filtered through a medium sintered glass funnel. The catalyst is slurried twice with a total of 300 ml. of methanol and then with water. The filtrate and methanol washings are combined and purged with nitrogen for about 20 minutes and 40 ml. of 0.1 N sodium hydroxide added to isomerize the 3-keto-Δ⁵ byproduct. The solution gives a very slightly basic test with pH paper. After about one hour, the base is neutralized with 40 ml. of 0.1 N hydrochloric acid. The solution is concentrated on a rotary evaporator equipped with a continuous addition tube and a water bath maintained at 45 to 55° C. until a gummy residue forms. Two 500 ml. portions of benzene are added and evaporated under the previous conditions to aid removal of water. A few drops of water remain and 500 ml. of ethyl acetate is added and evaporated until a thick slurry of crystals is obtained. The concentrate is cooled in an ice bath and filtered through a coarse sintered glass funnel and washed with two 20 ml. portions of ice cold ethyl acetate. The filtrate volume is 175 ml. and the filter cake hard and nearly white. It is air dried for about 16 hours and weighs 128 g. It is dissolved in 200 ml. of hot ethyl acetate, filtered through a medium sintered glass funnel to remove dust and sodium chloride. The solution is heated on a steam bath and concentrated to 250 ml. by passing a fast stream of nitrogen into the flask. The concentrate is cooled to about 50° C., seeded and further cooled in an ice bath for about an hour with stirring. The crystals are collected and washed with two 20 ml. portions of ice cold ethyl acetate to give 113 g. of product (VII) having

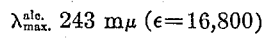
$\lambda_{max.}^{alc.}$ 243 mμ (ε=16,800)

The product (VII) is recrystallized again under the same conditions except that the solution is cooled more slowly to give dense, white, loose crystals weighing 96.5 g. after drying at 60° C. for about 72 hours,

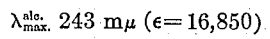
$\lambda_{max.}^{alc.}$ 243 mμ (ε=16,850)

A second crop of 10.6 g. of crystals is taken from the first mother liquor and recrystallized successively from each of the other mother liquors, then from fresh ethyl acetate to give 25.2 g. of VII, which by GLC is nearly as pure as the 96.5 g. of product (VII) described above, having

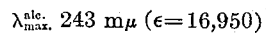
$\lambda_{max.}^{alc.}$ 243 mμ (ε=16,950)

The two crops are combined to give 121.7 g. (76% of theoretical yield) of 7β,17α-dimethyl-17-hydroxyandrost-4-en-3-one (VII).

EXAMPLE 6A

7β,17α-dimethyl-17-hydroxyandrost-4-en-3-one 17-acetate (VII') (7β,17α-dimethyltestosterone 17-acetate)

Following the procedure of Example 5A but substituting 7,17α-dimethyl - 17 - hydroxyandrosta-4,6-dien-3-one 17-acetate (V) as starting material yields 7β,17α-dimethyl-17-hydroxyandrost-4-en-3-one 17-acetate (VII').

Following the procedure of Example 6A but substituting another 7,17α-dimethyl-17-hydroxyandrosta-4,6-dien-3-one 17-acylate (V) as starting material, such as the 17-acetate, 17-butyrate, 17-caprylate, 17-isovalerate, 17-dodecanoate, 17 dimethylcyclohexanecarboxylate, 17-ethylbenzoate, 17-phenylpropiolate, 17-glutarate, 17-maleate, etc., yields the corresponding 7β,17α-dimethyl-17-hydroxyandrost-4-en-3-one 17-acylate (VII').

EXAMPLE 1B

3β-hydroxyandrost-5-en-7,17-dione 3-acetate (III′)

To a solution of 200 g. of androst-5-en-3β-ol-17-one 3-acetate (I′) (dehydroepiandrosterone acetate) in 650 ml. of acetic anhydride, 170 g. of anhydrous sodium chromate is added in portions with stirring and a little cooling. There is some heat of reaction that lasts for several hours. The reaction mixture is kept near 42° C. although at times the temperature drops to as low as 35° C. After about 72 hours the mixture is poured into about 5 l. of ice water with stirring. After stirring for about 1 hour the precipitate is filtered and then slurried three times with water. The precipitate is sucked as dry as possible and just enough ether added to make a thick slurry. The ether is sucked off and the filter cake slurried three more times with ether. This removes most of the starting material. The filter cake is dried in a vacuum oven at about 60° C. to give 145 g. of the crude product (III′). It is then dissolved in 200 ml. of methylene chloride, filtered and added dropwise to 3 l. of Skellysolve B with stirring. The slurry is chilled for about 16 hours and the precipitate collected and dried at about 60° C. to give 114 g. (55% yield) of 3β-hydroxyandrost-5-ene-7,17-dione (III′) having a melting point of 180 to 184° C;

$\lambda^{alc.}_{max.}$ (end absorption) $\lambda 236$ ($\epsilon = 13,750$)

The mother liquors are concentrated to nearly dryness and recrystallized from acetone-Skellysolve B to give 16 g. of additional product (III′); this is dissolved in 50 ml. of methylene chloride and added dropwise to 1 l. of Skellysolve B. After chilling, 12 g. (5.8% yield) of product (III′) is obtained having a purity (by TLC) similar to that of the main product.

EXAMPLE 2B

7,17α-dimethylandrost-5-ene-3β,7,17β-triol (IV′)

A Grignard reagent of 1,190 ml. of 3 M ethereal methylmagnesium bromide under nitrogen, is cooled in an ice bath. To this, 126 g. of 3β-hydroxyandrost-5-ene-7,17-dione 3-acetate (III′) (obtained as in Example 1B) is added in small portions while keeping the temperature of the reaction mixture below 10° C. The ice bath is removed and stirring continued for about 18 hours. The mixture is again cooled and 2.5 l. of methylene chloride added, followed by dropwise addition of saturated ammonium chloride solution. The pot temperature is kept below 20° C. After all of the Grignard reagent is reacted, the mixture is diluted to about 1.5 l. with water. The mixture is stirred for about 1 hour and the precipitate of product (IV′) filtered and washed successively with water, methylene chloride and ethyl acetate and dried under vacuum at about 60° C. for about 16 hours to give 46.5 g. of mainly 7α,17α-dimethylandrost-5-ene-3β,7,17β-triol (IV′). The filtrate and washings are combined and the water phase separated and extracted again with methylene chloride. The organic phase is combined and washed with water, dried over sodium sulfate and concentrated to dryness to give 78.5 g. of solid material containing a mixture of C-7 epimers of IV′ and unreacted 17-ketone (III′ where Ac=H). This material is dissolved in 78 ml. of acetic anhydride and 114 ml. of pyridine. After standing for about 16 hours, water is added and the product extracted with ether. The ether extract is washed successively with water, cold dilute hydrochloric acid until all of the pyridine is removed and with water until the washes are neutral pH. The ether solution is dried over sodium sulfate and evaporated to a glassy foam and dried at about 60° C. in a vacuum oven to give 73 g. of solid material. This material is recycled through the reaction with 3 M methylmagnesium bromide described above using 690 ml. of this Grignard reagent. The procedure is the same as above except that the triol product (IV′) does not precipitate. The aqueous phase is extracted with ethyl acetate. The organic phases are combined, washed with water, dried over sodium sulfate and concentrated to dryness to give a residue of 63 g. (IV′). It is combined with the 46.5 g. of product (IV′) obtained above for a total of 109 g. (90% yield) of 7,17α-dimethylandrost-5-ene-3β,7,17β-triol (IV′).

EXAMPLE 3B

7,17α-dimethyl-17-hydroxyandrosta-4,6-dien-3-one (V′)

A solution of 86 g. of crude 7,17α-dimethylandrost-5-ene-3β,7,17β-triol (IV′) (obtained as in Example 2B) in 860 ml. of xylene and 285 ml. of redistilled cyclohexanone is distilled in a nitrogen atmosphere until 65 ml. of distillate is obtained. The solution is cooled and 69 g. of aluminum isopropoxide is added. The solution is stirred and heated until about 80 ml. of solvent is distilled off to bring the boiling point of the reaction mixture up to 120° C. After about 20 minutes TLC analysis shows this reaction is complete. The solution is cooled to near room temperature, 130 g. of sodium potassium tartrate in 450 ml. of water added, and the mixture stirred vigorously for about one hour. The mixture is put on a rotary evaporator and the solvents removed by heating under vacuum in a steam bath. Water is added several times and distilled to help remove the cyclohexanone and condensation products. The concentrate, a yellow oil mixed with water, is extracted with methylene chloride. The extract is washed with dilute hydrochloric acid and water, dried over sodium sulfate, filtered, and concentrated to dryness to give 86 g. of crude product containing mainly 7,17α-dimethyl-17-hydroxyandrosta-4,6-dien-3-one (V′) and a small amount of 7β,17β-dihydroxy-7,17-dimethylandrost-4-en-3-one (V″). The minor product (V″) is isolated and purified by the procedure described in Example 4B, below; it is then used for conversion to the last stage intermediate (V′) in the manner set forth in Example 5B; Example 6B, below, shows the reduction of the double bond at the 6-position of the compound of Formula V′ (V′→VII) to obtain the final product of Formula VII.

A 79 g. sample of the crude product (V′+V″) is chromatographed on a 2 kg. column of alumina (Grade II) and eluted by gradient elutions between 5 l. of Skellysolve and B and 5 l. of 20% ethyl acetate-Skellysolve B, then between 5 l. of 20% ethyl acetate-Skellysolve B and 5 l. of 50% ethyl acetate-Skellysolve B, then between 5 l. of 50% ethyl acetate-Skellysolve B and 5 l. of 100% ethyl acetate (400 ml./fraction). The later fractions (45 to 53) which crystallize on trituration with wet ether are combined to give 32 g. of crude product (V′). After crystallization from acetone-ether-water, a yield of 14 g. (19% yield from I′) of 7,17α-dimethyl-17-hydroxyandrosta-4,6-dien-3-one (V′) is obtained having a melting point of 71 to 72° C., $\lambda^{alc.}_{max.}$ 296 m$\mu$, $\epsilon = 28,000$ A second crop of 4.34 g. (5.8% yield from I′) having $\lambda^{alc.}_{max.}$ 297 m$\mu$, $\epsilon = 27,700$ is obtained from acetone water. TLC analysis shows one spot moving with first crop material. The mother liquor residue weighing 8.5 g. shows $\lambda^{alc.}_{max.}$ 297 m$\mu$, $\epsilon = 17,200$

EXAMPLE 4B

7β,17β-hydroxy-7,17-dimethylandrost-4-en-3-one (V″)

A solution of 7.5 g. of 7,17-dimethylandrost-5-ene-3β,7,17β-triol (IV′) (obtained as in Example 2B) in 120 ml. of toluene is distilled until a few mls. of distillate is collected to remove any water present. The solution is cooled and 20 ml. of freshly distilled cyclohexanone and 2.5 g. of aluminum isopropoxide added. The mixture is refluxed for about 10 hours, cooled to room temperature and 100 ml. of 2 N and 10 ml. of 6 N hydrochloric acid added. The product is extracted with ether and washed with dilute hydrochloric acid and water. The solvents are removed and the residue dissolved in methylene chloride and poured on a column containing 400 g. of silica gel (silicic acid) packed wet with Skellysolve B. The products (V" and V') are eluted by gradient elution between 5 l. of 10% ethyl acetate-Skellysolve B and 5 l. of 60% ethyl acetate-Skellysolve B, then with several liters of 70% ethyl acetate-Skellysolve B. Each fraction collected is 400 ml. Fractions 36 through 32 contain 7,17α-dimethyl-17-hydroxyandrosta-4,6-dien-3-one (V') and fractions 36 through 40 contain 7β,17β-dihydroxy-7,17-dimethyl-androst-4-en-3-one (V"). Fractions 36 through 40 are combined and recrystallized twice from acetone-Skellysolve B to give 580 mg. of 7β,17β-dihydroxy-7,17-dimethylandrost-4-en-3-one (V") having a melting point of 185 to 190° C.;

$\lambda_{max.}^{alc.}$ 246 mμ

ε=15,400; m.s. m/e 332; nuclear magnetic resonance (NMR) spectra shows: 0.95 (s., c–18), 1.08 (s., c–19), 1.23 (s., [17–CH$_3$ and 7–CH$_3$], 5.73 (s., C–6–H).

*Analysis.*—Calcd. for C$_{21}$H$_{32}$O$_3$ (percent): C, 75.86; H, 9.70. Found (percent): C, 75.87; T, 10.39.

EXAMPLE 5B 7,17α-dimethyl-17-hydroxyandrosta-4,6-dien-3-one (V')

To a solution of 1 g. of 7β,17β-dihydroxy-7,17-dimethylandrost-4-en-3-one (V") in 15 ml. of boiling methanol, 10 ml. of 0.1 N potassium hydroxide solution is added and the reaction mixture refluxed for about 2 hours. The mixture is cooled and evaporated to dryness under vacuum. The residue is taken up in methylene chloride, chromatographed on neutral alumina, the product (V') isolated by gradient elution with ethyl acetate-Skellysolve B and crystallized by trituration with moist ether to yield 7,17α - dimethyl-17-hydroxyandrosta-4,6-dien-3-one (V').

Following the procedure of Example 5B but substituting 0.1 N hydrochloric acid for 0.1 N potassium hydroxide, also yields 7,17α-dimethyl-17-hydroxyandrosta-4,6-dien-3-one (V').

EXAMPLE 6B

7β,17α-dimethyl-17-hydroxyandrost-4-en-3-one (VII) (7β,17α-dimethyltestosterone)

By following the procedure of Example 5A, above, 7,17α-dimethyl-17-hydroxyandrosta-4,6-dien-3-one (V') is converted to 7β,17α - dimethyl-17-hydroxyandrost-4-en-3-one (VII).

What is claimed is:

1. A process for the production of 7β,17α-dimethyltestosterone of the formula

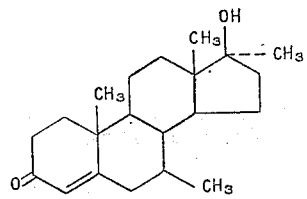

which comprises the steps of
(1) diacylating at the 3β- and 17β-positions of 17α-methyl-5-androstene-3β,17β-diol of the formula

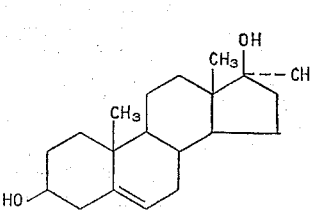

to yield a corresponding 17α-methyl-5-androstene-3β,17β-diol-3,17-diacylate of the formula

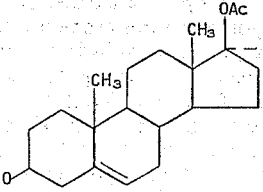

wherein Ac is the acyl radical of an organic carboxylic acid containing from one through twelve carbon atoms;

(2) oxidizing at the 7-position a thus produced compound resulting from step (1) to yield a corresponding 17α-methyl-7-oxoandrost-5-ene-3β-diol 3,17-diacylate of the formula

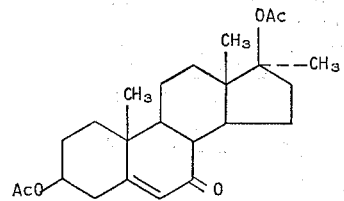

wherein Ac has the same meaning as above;

(3) methylating at the 7-position of a thus produced compound resulting from step (2) to yield a corresponding 7,17α - dimethylandrost - 5 - ene - 3β,7,17β-triol 17-acylate of the formula

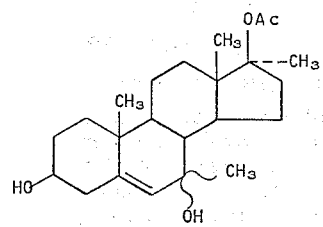

wherein ~ is a generic expression denoting α- and β-bonds and mixtures thereof and Ac has the same meaning as above;

(4) subjecting a thus produced compound resulting from step (3) to Oppenauer oxidation to yield a corresponding 7,17α-dimethyl-17-hydroxyandrosta-4,6-diene-3-one 17-acylate of the formula

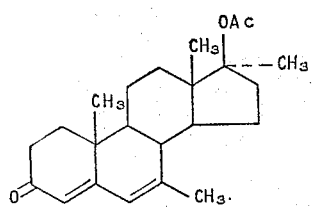

wherein Ac has the same meaning as above;

(5) hydrolyzing at the 17β-position of a thus produced compound resulting from step (4) to yield 7,17α-dimethyl-17-hydroxyandrosta-4,6 - dien - 3 - one of the formula

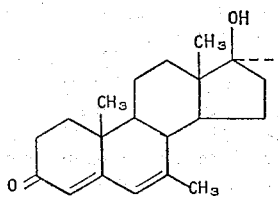

and (6) reducing the double bond at the 6-position of the thus produced compound resulting from step (5) to yield the compound of Formula VII, above.

2. A process in accordance with claim 1 wherein a 17α-methyl-5-androstene-3β,17β-diol 3,17-diacylate of Formula II produced in step (1), without isolation from the reaction mixture, is oxidized to yield a corresponding 17α-methyl-7-oxoandrost-5-ene-3β,17β-diol 3,17-diacylate of Formula III.

3. A process in accordance with claim 1 wherein in all of the compounds of Formulae II, III, IV and V, Ac is acetyl.

4. A process in accordance with claim 1 wherein the diacylation of step (1) is effected by heating the compound of Formula I with an anhydride of an organic carboxylic acid containing from two through twelve carbon atoms, the oxidation of step (2) is effected by mixing a compound of Formula II with an oxygenated hexavalent chromium compound, the methylation of step (3) is effected by mixing a compound of Formula III with a methylmagnesium halide, the Oppenauer oxidation of step (4) is effected by heating a compound of Formula IV with a ketone and an aluminum alkoxide, the hydrolysis of step (5) is effected by heating a compound of Formula V with an alkali metal hydroxide in an alkanol and the reduction of the double bond at the 6-position of step (6) is effected by mixing the compound of Formula VI with a hydrogenation catalyst and a hydrogen donor.

5. A process in accordance with claim 1 wherein the diacylation of step (1) is effected by heating the compound of Formula I with acetic anhydride, the oxidation of step (2) is effected by mixing the thus produced 3,17-diacetate compound of Formula II with sodium chromate, the methylation of step (3) is effected by mixing the 3,17-diacetate compound of Formula III with methyl-magnesium bromide, the Oppenauer oxidation of step (4) is effected by heating the 17-acetate compound of Formula IV with cyclohexanone and aluminum isopropoxide, the hydrolysis of step (5) is effected by heating the 17-acetate compound of Formula V with potassium hydroxide in methanol and the reduction of the double bond at the 6-position of step (6) is effected by mixing the compound of Formula VI with palladium/calcium carbonate catalyst and cyclohexene.

6. A process in accordance with claim 1 wherein the Oppenauer oxidation of step (4) is conducted at a temperature higher than 110° C.

7. A proceess for the production of a 7,17α-dimethyl-androst-5-ene-3β,17β-triol 17-acylate of the formula

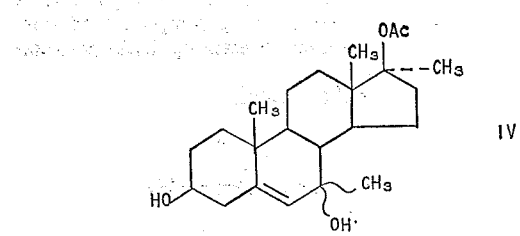

wherein ~ is a generic expression denoting α-bonds and β-bonds and mixtures thereof and Ac is the acyl radical of an organic carboxylic acid containing from one through twelve carbon atoms, which comprises methylating at the 7-position a corresponding 17α-methyl-7-oxoandrost-5-ene-3β,17β-diol 3,17-diacylate of the formula

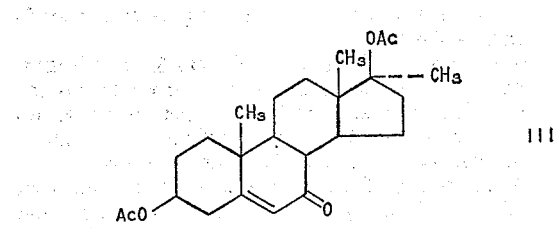

wherein Ac has the same meaning as above.

8. A process in accordance with claim 7 wherein the methylation is effected by mixing a compound of Formula III with a methylmagnesium halide.

9. A process in accordance with claim 7 wherein the methylation is effected by mixing the 3,17-diacetate compound of Formula III with methylmagnesium bromide.

10. A process for the production of a 7,17α-dimethyl-17-hydroxyandrosta-4,6-dien-3-one 17-acylate of the formula

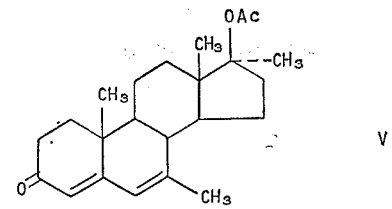

wherein Ac is the acyl radical of an organic carboxylic acid containing from one through twelve carbon atoms, which comprises the steps of (1) methylating at the 7-position a corresponding 17α-methyl-7-oxoandrost-5-ene-3β,17β-diol 3,17-diacylate of the formula

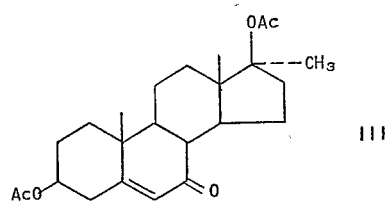

wherein Ac has the same meaning as above, to yield a corresponding 7,17-dimethylandrost-5-ene-3β,7,17β-triol 17-acylate of the formula

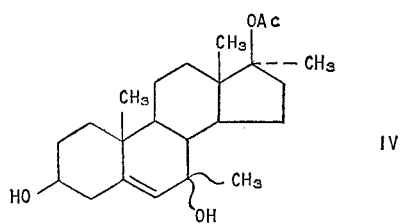

wherein Ac has the same meaning as above, and (2) subjecting a thus produced compound resulting from step (1) to Oppenauer oxidation to yield a corresponding compound of Formula V, above.

11. A process in accordance with claim 10 wherein the methylation of step (1) is effected by mixing a compound of Formula III with a methyl magnesium halide and the Oppenauer oxidation of step (2) is effected by heating a corresponding compound of Formula IV with a ketone and an aluminum alkoxide.

12. A process in accordance with claim 10 wherein the methylation of step (1) is effected by mixing the 3,17-diacetate of Formula III with methylmagnesium bromide and the Oppenauer oxidation of step (2) is effected by heating the 17-acetate compound of Formula IV with cyclohexanone and aluminum isopropoxide.

13. A process for the production of 7β,17α-dimethyl-testosterone of the formula

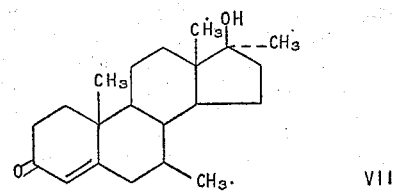

which comprises the steps of (1) methylating at the 7-position of a 17α-methyl-7-oxoandrost-5-ene-3β,17β-diol 3,17-diacylate of the formula

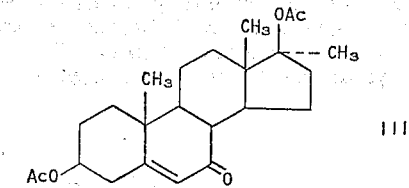

wherein Ac is the acyl radical of an organic carboxylic acid containing from one through twelve carbon atoms, to yield a corresponding 7,17α-dimethylandrost-5-ene-3β,7,17β-triol 17-acrylate of the formula

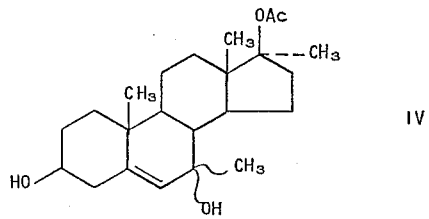

wherein ∼ is a generic expression denoting α- and β-bonds and mixtures thereof and Ac has the same meaning as above;
(2) subjecting a thus produced compound resulting from step (1) to Oppenauer oxidation to yield a corresponding 7,17α-dimethyl-17-hydroxyandrosta-4,6-dien-3-one 17-acylate of the formula

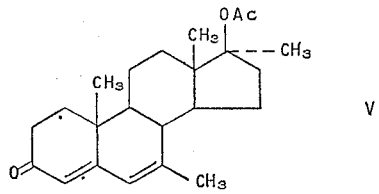

wherein Ac has the same meaning as above;
(3) hydrolyzing at the 17β-position of a thus produced compound resulting from step (2) to yield 7,17α-dimethyl-17-hydroxyandrosta-4,6-dien-3-one of the formula

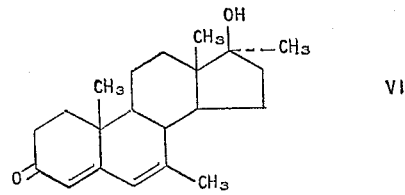

and (4) reducing the double bond at the 6-position of the thus produced compound resulting from step (3) to yield the compound of Formula VII, above.

14. A process in accordance with claim 13 wherein the methylation of step (1) is effected by mixing a compound of Formula III with a methylmagnesium halide, the Oppenauer oxidation of step (2) is effected by heating a compound of Formula IV with a ketone and an aluminum alkoxide, the hydrolysis of step (3) is effected by heating a compound of Formula V with an alkali metal hydroxide in an alkanol and the reduction of the double bond at the 6- position of step (4) is effected by mixing the compound of Formula VI with a hydrogenation catalyst and a hydrogen donor.

15. A process in accordance with claim 13 wherein the methylation of step (1) is effected by mixing the 3,17-diacetate compound of Formula III with methylmagnesium bromide, the Oppenauer oxidation of step (2) is effected by heating the 17-acetate compound of Formula IV with cyclohexanone and aluminum isopropoxide, the hydrolysis of step (3) is effected by heating the 17-acetate compound of Formula V with potassium hydroxide in methanol and the reduction of the double bond at the 6-position of step (4) is effected by mixing the compound of Formula VI with palladium/calcium carbonate catalyst and cyclohexene.

16. A process for the production of a compound of the formula

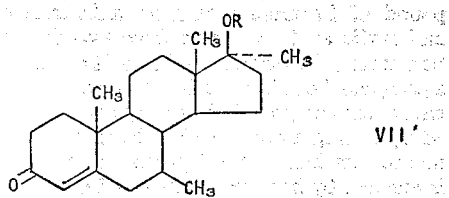

wherein R is selected from the group consisting of hydrogen and the acyl radical of an organic carboxylic acid containing from one through twelve carbon atoms, which comprises reducing the double bond at the 6-position of a corresponding compound of the formula

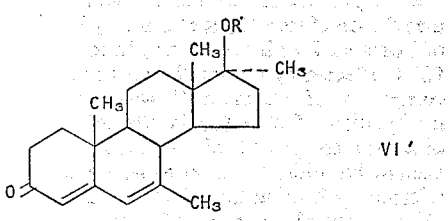

wherein R has the same meaning as above.

17. A process in accordance with claim 16 wherein the reduction of the double bond at the 6- position is effected by mixing a corresponding compound of Formula VI' with a hydrogenation catalyst and a hydrogen donor.

18. A process in accordance with claim 16 wherein the reduction of the double bond at the 6- position is effected by mixing a corresponding compound of Formula VI' with palladium/calcium carbonate catalyst and cyclohexene.

19. A process in accordance with claim 16 wherein the reduction of the double bond at the 6-position is effected by mixing a corresponding compound of Formula VI' with a palladium containing hydrogenation catalyst and hydrogen.

20. A compound of the formula

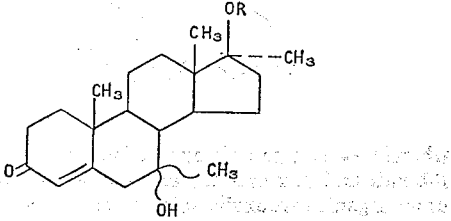

wherein R is selected from the group consisting of hydrogen and the acyl radical of a hydrocarbon carboxylic acid containing from one through twelve carbon atoms and ∼ is a generic expression denoting α- and β-bonds and mixtures thereof.

21. A compound of claim 20 wherein R is hydrogen, the bond to the hydroxyl group at the 7-position has the β-stereoconfiguration and the bond to the methyl group at the 7-position has the α-stereoconfiguration, namely, 7β,17β-dihydroxy-7,17-dimethylandrost-4-en-3-one.

22. A compound of claim 20 wherein R is hydrogen, the bond to the hydroxyl group at the 7-position has the α-stereoconfiguration and the bond to the methyl group at the 7-position has the β-stereoconfiguration, namely, 7α,17β-dihydroxy-7,17-dimethylandrost-4-en-3-one.

23. A compound of claim 20 wherein R is the acyl radical of a hydrocarbon carboxylic acid containing from two through twelve carbon atoms, the bond to the hydroxyl group at the 7-position has the β-stereoconfiguration and the bond to the methyl group at the 7-position has the α-stereoconfiguration, namely, 7β,17β-dihydroxy-7,17-dimethylandrost-4-en-3-one 17- acylate.

24. A compound of claim 20 wherein R is acetyl, the bond to the hydroxyl group at the 7-position has the β-stereoconfiguration and the bond to the methyl group at the 7 - position has the α-stereoconfiguration, namely, 7β,17β - dihydroxy-7,17-dimethylandrost-4-en-3-one 17-acetate.

25. A compound of claim 20 wherein R is acetyl, the bond to the hydroxyl group at the 7-position has the α-stereoconfiguration and the bond to the methyl group at the 7-position has the β-stereoconfiguration, namely, 7α,17β-dihydroxy-7,17-dimethylandrost - 4 - en - 3 - one 17-acetate.

26. A process for the production of 7β,17α-dimethyl-testosterone of the formula

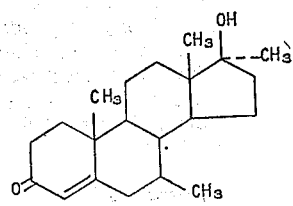

VII which comprises the steps of
(1) oxidizing at the 7-position an androst-5-en-3β-ol-17-one 3-acylate of the formula

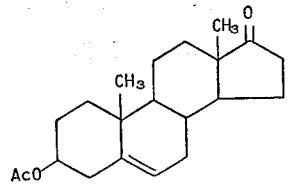

I' wherein Ac is the acyl radical of an organic carboxylic acid containing from one through twelve carbon atoms, to yield a corresponding 3β-hydroxy-androst-5-ene-7,17-dione 3-acylate of the formula

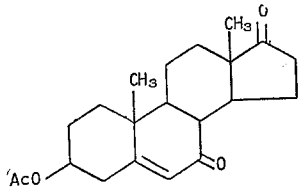

III' wherein Ac has the same meaning as above;
(2) methylating at both the 7- and 17-positions of a thus produced compound resulting from step (1) to yield 7,17α-dimethylandrost-5-ene-3β,7,17β - triol of the formula

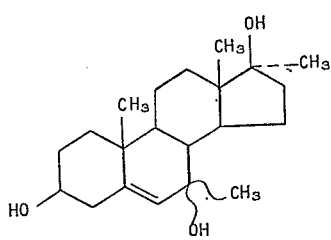

IV' wherein ~ is a generic expression denoting α- and β-bonds and mixtures thereof;

(3) subjecting a thus produced compound resulting from step (2) to Oppenauer oxidation to yield 7,17α-dimethyl-17-hydroxyandrosta-4,6-dien-3 - one of the formula

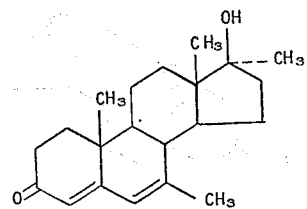

V' and 7α,17α-dimethylandrost-4-en-7β,17β-diol-3 - one of the formula

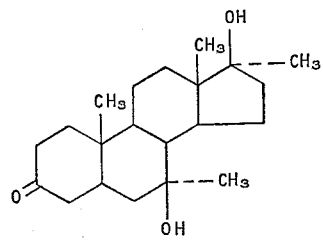

V'' and (4) reducing the double bond at the 6-position of the thus produced 7,17α-dimethyl-17-hydroxy-androsta-4,6-dien-3-one (V') resulting from step (3) to yield the compound of Formula VII, above.

27. A process in accordance with claim 26 wherein the oxidation of step (1) is effected by mixing a compound of Formula 1' with an oxygenated hexavalent chromium compound, the methylation of step (2) is effected by mixing a compound of Formula III' with a methylmagnesium halide, the Oppenauer oxidation of step (3) is effected by heating a compound of Formula IV' with a ketone and an aluminum alkoxide and the reduction of the double bond at the 6-position of step (4) is effected by mixing the compound of Formula V' with a hydrogenation catalyst and a hydrogen donor.

28. A process in accordance with claim 26 wherein the oxidation of step (1) is effected by mixing a compound of Formula I' with sodium dichromate, the methylation of step (2) is effected by mixing the 3-acetate compound of Formula III' with methylmagnesium bromide, the Oppenauer oxidation of step (3) is effected by heating the compound of Formula IV' with cyclohexanone and aluminum isopropoxide and the reduction of the double bond at the 6-position of step (4) is effected by mixing the compound of Formula V' with palladium/calcium carbonate and cyclohexene.

29. A process in accordance with claim 26 wherein the Oppenauer oxidation of step (3) is conducted at a temperature higher than 110° C.

30. A process for the production of 7,17α-dimethyl-androst - 5 - ene - 3β,7,17β-triol of the formula

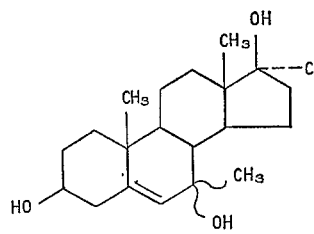

IV' wherein ~ is a generic expression denoting α- and β-bonds and mixtures thereof, which comprises simultaneously methylating at the 7- and 7ξ-positions a 3β-hydroxy-androst - 5 - ene - 7,17-dione 3 - acylate of the formula

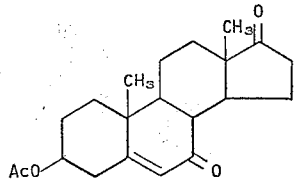

wherein Ac is the acyl radical of an organic carboxylic acid containing from one through twelve carbon atoms.

31. A process in accordance with claim 30 wherein the methylation is effected by mixing a compound of Formula III' with a methylmagnesium halide.

32. A process in accordance with claim 30 wherein the methylation is effected by mixing a compound of Formula III' with methylmagnesium bromide.

33. A process for the production of a compound of the formula

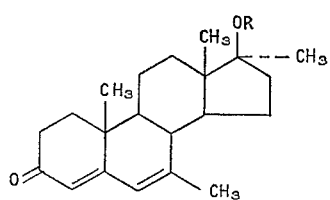

wherein R is selected from the group consisting of hydrogen and the acyl radical of an organic carboxylic acid containing from one through twelve carbon atoms, which comprises dehydrating a corresponding compound of the formula

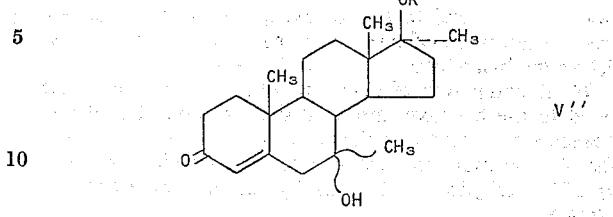

wherein R has the same meaning as above and ∼ is a generic expression denoting α-bonds and β-bonds and mixtures thereof.

34. A process in accordance with claim 33 wherein the dehydration is effected by acid or base.

35. A process in accordance with claim 33 wherein the compound of Formula V' is 7,17α-dimethyl-17-hydroxy-androsta-4,6-dien-3-one and the compound of Formula V" is 7α,17α-dimethyl-7,17-dihydroxyandrost-4-en-3-one.

36. A process in accordance with claim 33 wherein 7α,17α-dimethyl-7,17-dihydroxyandrost-4-en-3 - one (V") is dehydrated by heating with potassium hydroxide in boiling methanol to yield 7,17α-dimethyl - 17 - hydroxy-androsta-4,6-dien-3-one (V').

References Cited

UNITED STATES PATENTS

| | | | |
|---|---|---|---|
| 3,318,929 | 5/1967 | Anner et al. | 260—397.5 |
| 3,262,949 | 7/1966 | Rengold et al. | 260—397.3 |

ELBERT L. ROBERTS, Primary Examiner

U.S. Cl. X.R.

260—397.5